(12) United States Patent
Matte

(10) Patent No.: US 7,086,491 B2
(45) Date of Patent: Aug. 8, 2006

(54) PERSONAL COMPACT CART

(76) Inventor: Denis Matte, 2928 de la Promenade, Ste-Foy, Quebec (CA) G1W 2J4

( * ) Notice: Subject to any disclaimer, the term of this patent is extended or adjusted under 35 U.S.C. 154(b) by 99 days.

(21) Appl. No.: 10/392,655

(22) Filed: Mar. 20, 2003

(65) Prior Publication Data

US 2004/0182615 A1    Sep. 23, 2004

(51) Int. Cl.
*B60K 11/00* (2006.01)
(52) U.S. Cl. .............. 180/65.1; 180/21; 180/907; 180/908; 280/87.041; 280/220; 280/DIG. 5
(58) Field of Classification Search ............ 280/47.34, 280/47.35, 657, 87.041, 87.042, DIG. 5, 280/DIG. 6, 645, 42, 651, 87.043; 180/65.1, 180/65.2, 6.48, 6.5, 311, 312
See application file for complete search history.

(56) References Cited

U.S. PATENT DOCUMENTS

| | | | | |
|---|---|---|---|---|
| 2,962,106 | A | * | 11/1960 | Burnside et al. ........... 180/19.3 |
| 3,247,923 | A | * | 4/1966 | Cornell ...................... 180/19.1 |
| 3,648,795 | A | * | 3/1972 | Moulton ..................... 180/216 |
| 4,337,963 | A | * | 7/1982 | Stevenson ............... 280/87.042 |
| 4,538,695 | A | * | 9/1985 | Bradt ........................ 180/19.2 |
| 4,573,549 | A | * | 3/1986 | Pankow ...................... 180/216 |
| 4,802,547 | A | * | 2/1989 | Nakasaki .................... 180/216 |
| 4,811,964 | A | | 3/1989 | Horn |
| 4,848,504 | A | * | 7/1989 | Olson ........................ 180/19.1 |
| 4,874,055 | A | | 10/1989 | Beer |
| 4,998,596 | A | | 3/1991 | Miksitz |
| 5,137,103 | A | * | 8/1992 | Cartmell ...................... 180/167 |
| 5,180,023 | A | * | 1/1993 | Reimers ..................... 180/19.1 |
| 5,328,193 | A | * | 7/1994 | Shiew ................... 280/87.041 |
| 5,350,982 | A | * | 9/1994 | Seib ........................... 318/139 |
| 5,363,934 | A | * | 11/1994 | Edmund et al. ............. 180/6.5 |
| 5,366,037 | A | | 11/1994 | Richey |

(Continued)

FOREIGN PATENT DOCUMENTS

DE    19648419 A    5/1997

(Continued)

*Primary Examiner*—Christopher P. Ellis
*Assistant Examiner*—Bridget Avery
(74) *Attorney, Agent, or Firm*—Harrington & Smith, LLP

(57) ABSTRACT

A personal cart comprises a mounting structure secured onto two parallel and aligned suspension members near their respective proximal longitudinal ends so as to rest thereon, and extending both upwardly and longitudinally so as to generally define an angle with said suspension members, two driving wheels, each mounted to a respective suspension member near its proximal end, two driven wheels, each rotatably mounted to a respective suspension member near its distal end, and actuating means coupled to both driving wheels for selectively causing rotation of at least one of said two driving wheels. The actuating may includes a controller and a rechargeable battery or be in the form of a hand actuating device including two endless belts mounted along angled portions of the mounting structure. The personal cart comprises few components and is relatively compact which provides a long autonomy in the case of an electrically actuated embodiment, and less effort to actuate in the case of the hand actuating embodiment.

52 Claims, 5 Drawing Sheets

U.S. PATENT DOCUMENTS

| | | |
|---|---|---|
| 5,657,828 A | 8/1997 | Nagamachi |
| 5,971,091 A | 10/1999 | Kamen et al. |
| 5,975,225 A | 11/1999 | Kamen et al. |
| 6,173,986 B1 | 1/2001 | Sicher |
| 6,189,304 B1 * | 2/2001 | Velke et al. ................ 56/14.7 |
| 6,299,186 B1 * | 10/2001 | Kao et al. ............. 280/87.041 |
| 6,367,817 B1 | 4/2002 | Kamen et al. |
| 6,371,228 B1 * | 4/2002 | Husted et al. ............ 180/65.1 |
| 6,390,216 B1 | 5/2002 | Sueshige et al. |
| 6,474,688 B1 * | 11/2002 | Bogren et al. ............. 280/771 |
| 6,505,845 B1 * | 1/2003 | Fong ......................... 280/228 |
| 6,659,208 B1 * | 12/2003 | Gaffney et al. ............ 180/19.2 |
| 6,840,524 B1 * | 1/2005 | Yu ....................... 280/87.041 |

FOREIGN PATENT DOCUMENTS

| | | | |
|---|---|---|---|
| EP | 0578884 A | 1/1994 | |
| JP | 5-178241 | * 7/1993 | ........... 280/DIG. 5 |
| JP | 5-208057 | * 8/1993 | ............. 280/1.189 |
| JP | 11-70201 | * 3/1999 | |

\* cited by examiner

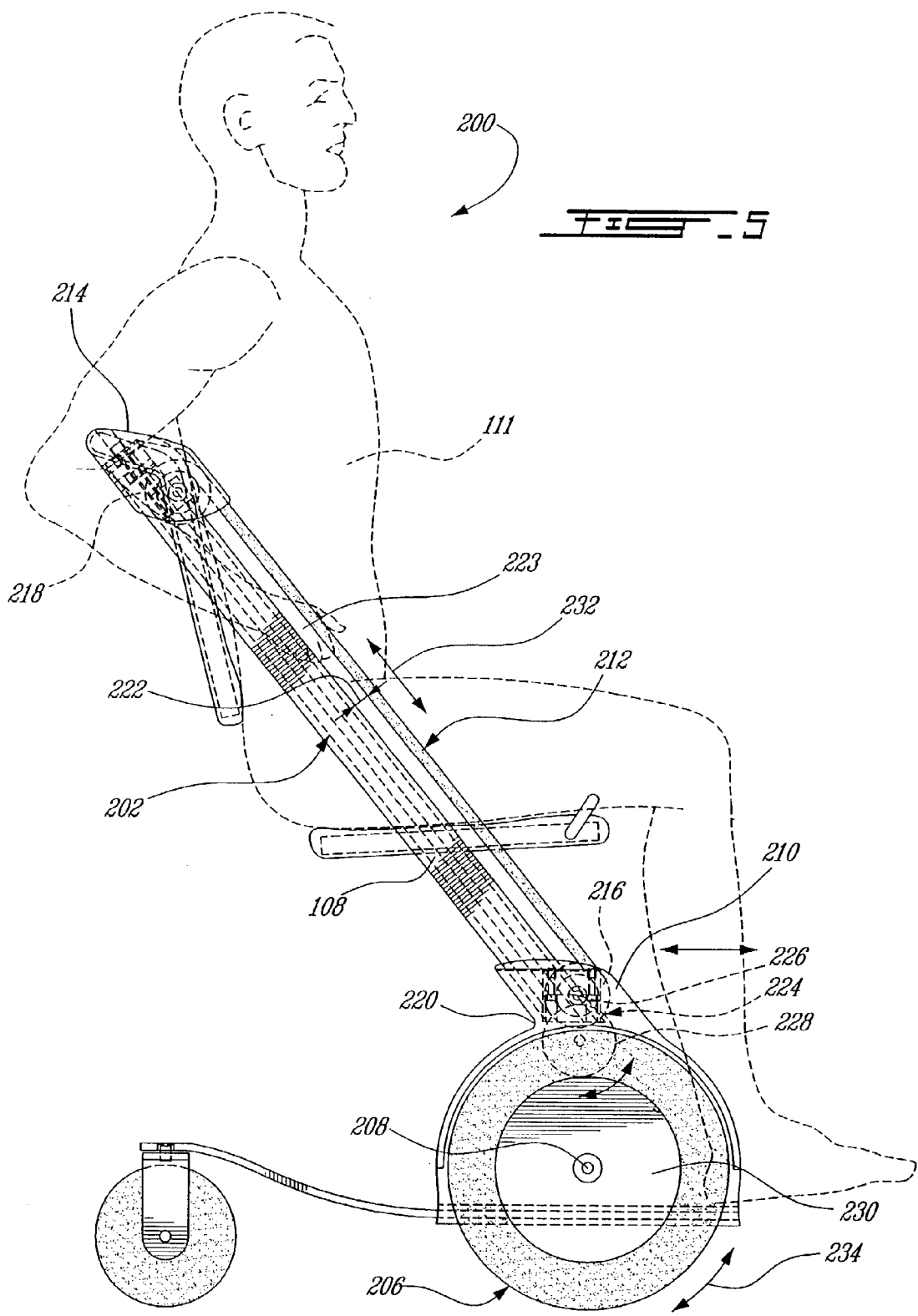

US 7,086,491 B2

PERSONAL COMPACT CART

FIELD OF THE INVENTION

The present invention generally relates to personal vehicles. More specifically, the present invention is concerned with a personal compact cart.

BACKGROUND OF THE INVENTION

Many embodiments of a personal cart allowing to carry around one or a plurality of passengers are known although their forms vary according to the application and the needs of the user.

For example, such personal carts are well known in the leisure industry, and more specifically in the golf industry where they are used to carry players and their equipment around a golf course. As it is well known, the general configuration of a typical golf cart is similar to the configuration of most four wheels road vehicles. It includes a bulky frame mounted on four wheels, seats mounted to the frame to support one or more passengers, and conventional propulsion, transmission, steering and brake means. A conventional golf cart is either energize by a combustion or an electrical engine.

A first major drawback of conventional golf carts is their relatively important weight, which is of course somehow detrimental to the golf course surface since they cause compaction of the golf surface, but more importantly that limits their autonomy. A typical golf cart weighs near 1000 lbs. With the additional weight of two peoples with their golf bag, the total weight can reach nearly 1500 lbs. Therefore, such golf cart equipped with an electrical engine has an autonomy allowing to play about 36 holes of an average size golf course, depending on the golf course geometry, the weight of the actual vehicle, the passengers and their equipment, while a typical golf cart equipped with a combustion engine has a slightly greater autonomy than an electric cart. In addition, golf carts equipped with a combustion engine have the drawback of causing direct pollution, which is less and less well perceived.

Another drawback of conventional golf carts is that they are most often bulky, taking an excessive amount of place when parked at the end of the day, especially considering the fleet required to accommodate the large amount of simultaneous players in an important golf site.

A fourth drawback of conventional golf carts is that their design yields numerous mechanical components, which increases the probability of mechanical failure, in addition to call for frequent periodic mechanical inspections.

In U.S. Pat. No. 6,390,216, issued on May 21, 2002, and entitled "Motorized Cart" Sueshige et al. propose a foldable three-wheel one-passenger motorized cart having a tubular frame, at least one driving motor housed in one of the wheel, and a battery housed in another wheel. The general configuration of the vehicle is that of a conventional tricycle, having a front steering wheel operated by and turning in unison with a two-hand handle bar.

A first drawback of Sueshige's vehicle is that it is relatively long, rendering it difficult to steer, especially considering that the steering is achieved by manually turning the two-hand handle bar.

Also, the fact that the steering and the braking are mechanical renders the cart more bound to breakage thus ideally requiring frequent periodic mechanical inspections.

Sueshige solves the storage space problem by making the cart foldable. However, by doing this, he creates the further problem of requiring additional time to store the cart, while adding moving mechanical pieces with the above-mentioned related drawback. Also Sueshige vehicle lacks suspension means to help smooth the ride of its passenger.

Finally, Sueshige vehicle's three-wheel configuration may lack stability on some terrain, especially during turning.

A golf cart having a minimum of parts, especially moving parts, while remaining both stable and comfortable in most driving situations is thus desirable.

Another known embodiment of compact carts is the well-known wheelchair. As the name suggest, the configuration of a conventional wheelchair is based on a chair, to which wheels are provided. A wheelchair may either be equipped with automatic propulsion means, including an electrical engine energized by a battery, or with oversize back wheel that can be reached by the user for causing their rotation.

A first drawback of conventional wheelchairs is that they are most often too heavy. This can be seen as a drawback, since, the weight of the chair has a direct impact on either the ease of the user to manually rotate the wheel, or, as with golf cart, on the autonomy of an electrically powered model.

Finally, a new type of personal vehicle as seen the light recently that has a configuration aiming at addressing the autonomy and size problems of the above described personal carts. An example of this new type of vehicle is described in U.S. Pat. No. 5,971,091 issued to Kamen et al. on Oct. 26, 1999, and entitled "Transportation Vehicles And Methods".

Although Kamen vehicles' autonomy is increased compared to typical golf cart or wheelchair, it is limited to a single passenger, standing, and without luggage. Hence, its use is limited to only a handful of applications, and is not suitable, for example, as a wheelchair or as a golf cart.

SUMMARY OF THE INVENTION

More specifically, in accordance with the present invention, there is provided a personal cart comprising: a carriage assembly including a base and four wheels rotatably mounted to the base so as to define a quadrilateral; the four wheels including two driving wheels and two driven wheels; the two driving wheels being distanced along a direction perpendicular to their rotational axis; a load receiving structure mounted to the base near a side of the quadrilateral and extending towards an opposite side thereof for receiving a load over the base so that the load is substantially comprised within the quadrilateral; and actuating means coupled to the two driving wheels for causing rotation of the two driving wheels.

According to the present invention, there is also provided a personal cart comprising: two generally aligned and parallel flat suspension members, each having proximal and distal longitudinal ends; a passenger receiving structure secured to both suspension members near their respective proximal longitudinal ends so as to rest thereon, and extending both upwardly and longitudinally so as to generally define an angle with the suspension members; two driving wheels, each mounted to a respective suspension member near the proximal longitudinal end thereof; two driven wheels, each mounted to a respective suspension member near the distal longitudinal end thereof; and actuating means coupled to both driving wheels for selectively causing rotation of at least one of the two driving wheels.

According to the present invention, there is further provided a personal cart comprising: a frame assembly including i) two longitudinal flat members generally lying in a first plane, each longitudinal member having first and second longitudinal ends, and ii) a mounting structure generally defining a second plane defining an angle with the first plane; the second plane intersecting both longitudinal members near their first longitudinal ends; two parallel driving wheels, each rotatably mounted to the frame assembly near the first longitudinal end of a respective one of the two longitudinal members; two driven wheels, each rotatably mounted to the second longitudinal end of a respective one of the longitudinal members; and actuating means coupled to the two parallel driving wheels for selectively causing rotation of at least one of the two parallel driving wheels.

The general configuration of a personal cart according to the present invention allows to minimize the number of components and its size without compromising its stability. The configuration of a personal cart according to the present invention allows for a passenger to be seated or to carry a load with him, while having a relatively low weight, which results in a vehicle with an autonomy greater than personal vehicle from the prior-art aiming at equivalent applications.

Finally, in accordance with the present invention there is provided a wheelchair comprising: a base having two generally parallel longitudinal flat suspension members, each having a distal end and a proximal end; two generally parallel beams, each mounted to the base near the proximal end of a respective one of the two suspension members so that the two generally parallel beams are generally parallel to the two suspension members and extend from the base over the two suspension members, defining an angle therewith; a seat secured to both the parallel beams therebetween so as to be generally parallel to the two suspension members; a backseat secured to both the parallel beams therebetween and beyond the seat relative to the base; two driving wheels, each one mounted to the base near a respective proximal end of one of the two suspension members; two driven wheels, each one mounted to the base near a respective distal end of one of the two suspension members; and actuating means secured to the cart for selectively causing the rotation of at least one of the two driving wheels.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the appended drawings:

FIG. 5 is a side view of a wheelchair according to a third embodiment of a personal cart according to the present invention.

DESCRIPTION OF THE PREFERRED EMBODIMENT

Figure 1:
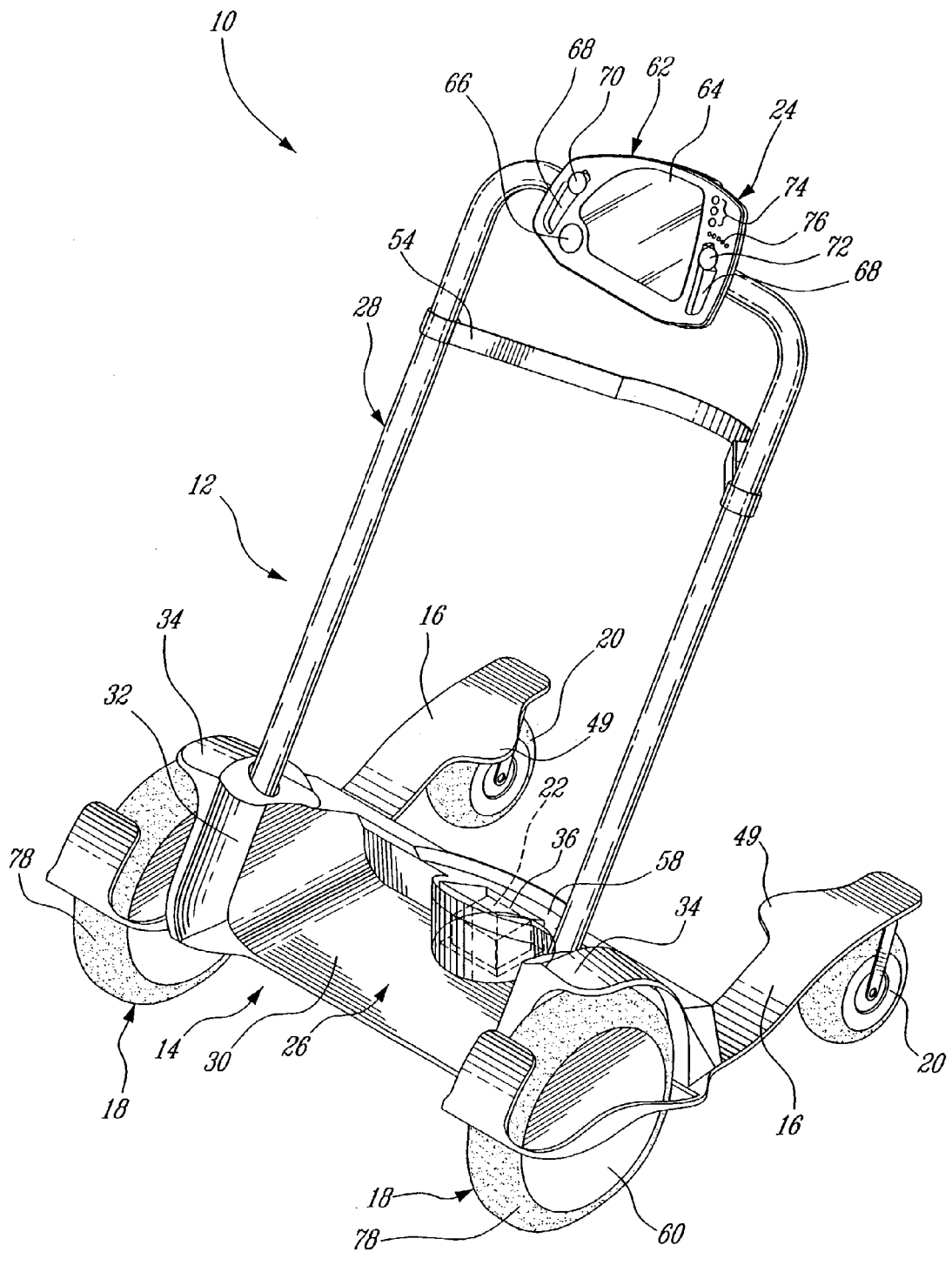
FIG. 1 is an isometric view of a golf cart according to a first embodiment of a personal cart according to the present invention.
Figure 2:
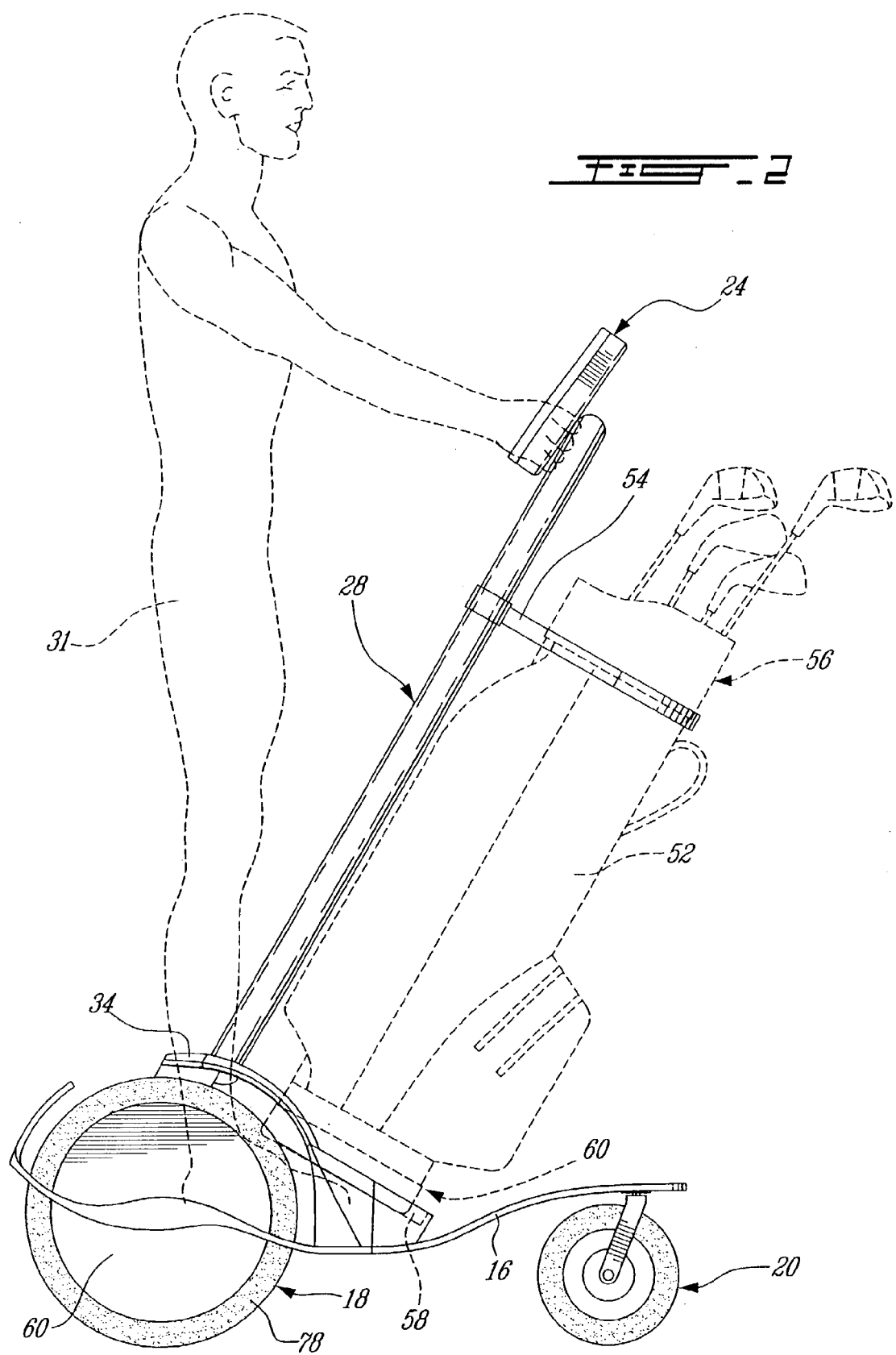
FIG. 2 is a side view of the golf cart from FIG. 1, illustrated carrying a passenger and a golf bag.

Turning now to FIGS. 1 and 2, a personal golf cart 10 according to a first embodiment of the present invention is illustrated.

The golf cart 10 comprises a frame assembly 12 including a passenger receiving structure 14 mounted on longitudinal blade-like suspension members 16, two driving wheels 18, two driven wheels 20, a battery 22, and a controller 24.

The passenger receiving structure 14 includes a base 26, and a mounting structure 28. The base 26 includes a generally flat portion 30 for receiving a passenger 31 standing on his feet, two opposite lateral mounting structure receiving portions 32, two mudguard portions 34, each secured to a respective mounting structure receiving portion 32 opposite the flat portion 30, and a battery receiving compartment 36 advantageously closed by an access door (not shown).

The frame assembly 12 can be made from a single piece or assembled from various components. The frame assembly 12 is preferably made of polymer, for example, by rotational molding, by blow molding and injection molding. Polymeric materials that are suitable for making the frame assembly 12 include cross-link polyethylene (PE), low-density PE, high-density PE, polyvinyl chloride (PVC), LLDPE, and polycarbonate. Alternatively, another lightweight material such as aluminum can also be used for the overall frame assembly 12 or for some components thereof.

The mounting structure 28 is in the form of an inverted U-shaped tubular frame generally defining a plane and extending from the base 26 so as to define an angle therewith as it will be explained hereinbelow in more detail. Each of the two free ends of the tubular frame are house in a snugly manner in an aperture in a respective of the two opposite lateral mounting structure receiving portions 32. Of course, the mounting structure may have other configurations.

The blade-like suspension members 16 are mounted to the passenger receiving structure 14 underneath therefrom.

Figure 3:
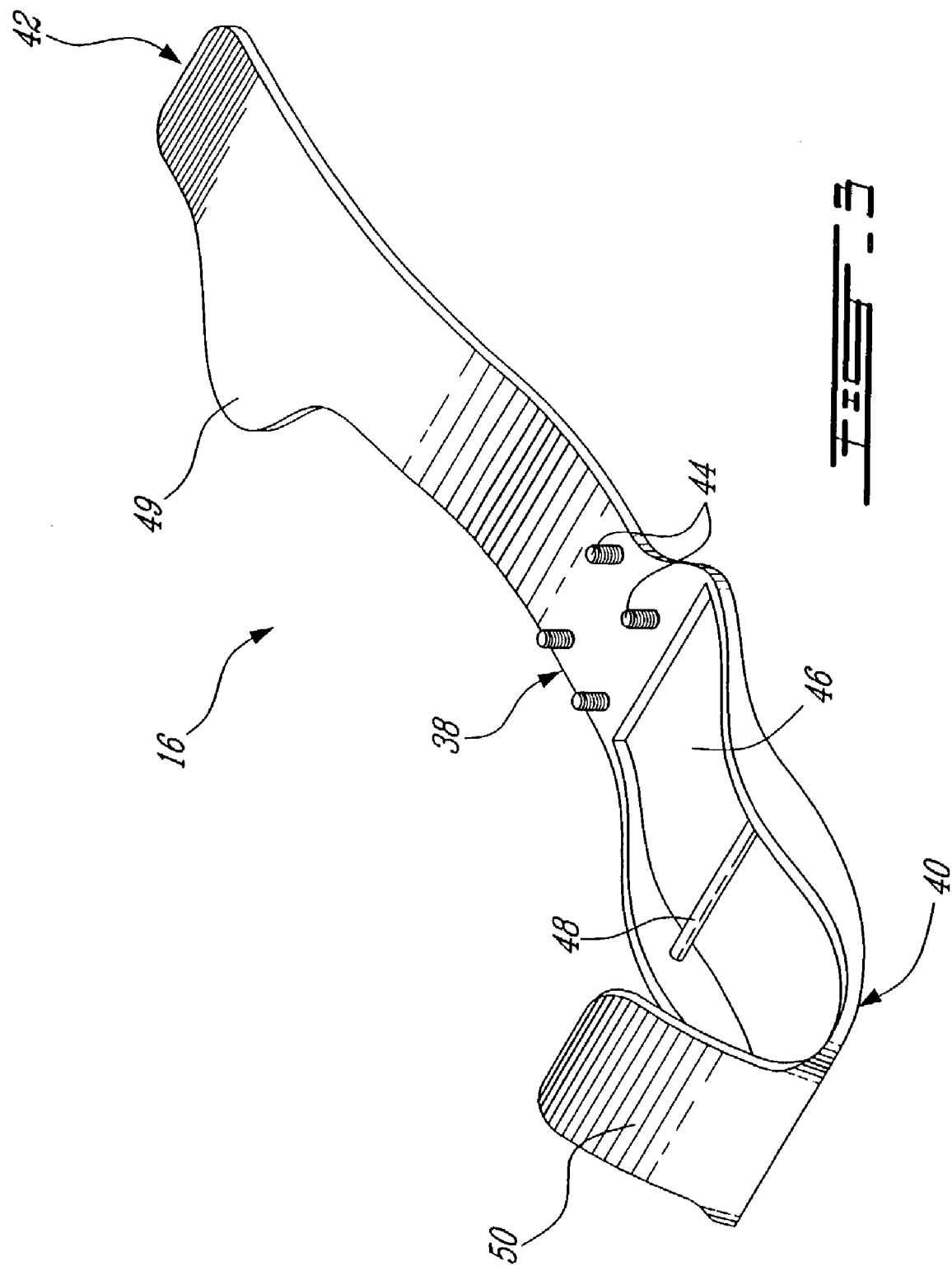
FIG. 3 is an isometric view of a suspension of the golf cart from FIG. 1.

Turning now briefly to FIG. 3, one of the two identical blade-like suspension members 16 will be described. The suspension member 16 is flat and resilient. It includes a central portion 38 between first and second longitudinal end portions 40 and 42. The first and second end portions 40–42 are raised relatively to the central portion 38 so as to define a bow-like profile.

The passenger receiving structure 14 is advantageously secured to the two suspension members 16 via the central portion 38. The central portion 38 includes screws 44 for securing the suspension member 16 to the passenger receiving structure 14. Of course, the base 26 is configured to receive the screws 44.

The first longitudinal end portion 40 includes a rectangular opening 46 to allow passage for a driving wheel 18. For that purpose, a transversal rod 48 is provided in the rectangular opening for receiving a driven wheel 18. The transversal rod 48 is removable to allow mounting and removing of the driving wheel 18.

The suspension effect occurs more specifically between the rod 48 and the central portion 38, and between the central portion 38 and the portion of the second longitudinal end portion 42 where the driven wheel 20 is mounted.

A driven wheel 20, advantageously in the form of a swivel wheel is secured to the suspension member 16 at its second longitudinal end portion 42. Alternatively, a fixed-type wheel, which is mounted to the suspension member so as to only allow rotation of the wheel about its rotational axis, may also be used, however reducing the maneuverability of the cart 10.

The mounting of the wheels 18 and 20 directly to a suspension member 16 near its longitudinal ends 40 and 42 respectively so as to be generally perpendicular to the flat side of the member 16, and the fact that the member 16 is in the form of a flat resilient blade, allows to transform the member 16 in a suspension member for absorbing shocks as the cart 10 moves on an unleveled terrain.

The suspension member 16 further includes a first mudguard portion 50 extending generally perpendicularly from the first longitudinal end portion 40 adjacent the rectangular opening 46, and a second mudguard portion 49, laterally extending from the second longitudinal end portion 42.

It is to be noted that the profile of the suspension member 16 allows to maximize the suspension effect of the golf cart 10, considering the general configuration of the passenger receiving structure 12 and the expected load on the cart 10. More specifically, the profile of the suspension member 16 allows for a travel of up to 2" for the back driven wheels 18, and of up to 1¾" for the front driven wheels 20.

The suspension member 16 is made of a material providing both rigidity and resilience, such as, but not limited to: polyester, epoxy, fiberglass, carbon fiber, and Kevlar. More specifically, the suspension member 16 includes directional fibers where resilience is sought, and bi-directional elsewhere.

Metallic inserts may be provided in the suspension member 16 to receive the rod 48, and/or fastening means 44.

Alternatively, the suspension member 16 is made of metal having the appropriate properties as described herein, such as steel and aluminum.

The two suspension members 16 and the four wheels 18 and 20 form a carriage assembly with the base 26. The four wheels 18 and 20 define a quadrilateral.

The mounting structure 28 is secured to the base 26 along the side of the quadrilateral that is defined by the two driving wheels 18 and extends towards an opposite side thereof so as to be aligned with the two parallel suspension members 16.

The structure 28 allows mounting a load, such as a golf bag 52 with clubs. For that purpose, the mounting structure 28 further comprises a rigid strip, made of metal or plastic, secured to the tubular frame so as to define a bracket 54 for receiving the upper portion 56 of a golf bag 52. The front portion of the base 26 includes a semi-circular recess 58 over the battery receiving compartment 36 for supporting the lower portion 60 of the bag 52.

The recess 58 is practiced on an angled surface relative to the flat portion 30 of the base 26 so that the golf bag 52 rests parallel to the mounting structure 28 and therefore at an angle relative to the flat portion 30 of the base 26.

The mounting structure 28 allows to receive a load, which is, in the present embodiment, in the form of a golf bag 52, within the quadrilateral formed by the four wheels 18 and 20. Moreover, since the mounting structure 28 defines an angle with the two suspension members 16, and since the passenger receiving structure 14, which includes the mounting structure 28, is so mounted on the two suspension members 16 so as to rest thereon, the weight of the mounting structure 28 and of a carried load spans over the length of the two suspension members 16, which help bringing stability to the golf cart 10.

Moreover, the angle of the mounting structure 28 relatively to the two suspension members 16 and therefore to the ground also allows to limit the length of the cart 10.

Alternatively, the mounting structure 28 may have different configurations and sizes. For example, it may be in the form of a central pole extending at an angle from the base 26.

The driving wheels 18 are in the form of motor-wheels. As it is believed to be well-known in the art, each motor-wheel includes a motor (not shown) mounted in its rim 60 and a rotating portion 78 rotatably mounted into the rim 60 and advantageously having a peripheral portion covered with rubber or any other resilient shock-absorbing material. As it is well-known in the art, the rotating portion is driven by the motor (not shown) located in the rim 60. The motor is advantageously electrical. In a most preferred embodiment of the present invention, the motor-wheels have the following specifications:

Power up to 850 watts at 48 volts;
Stall torque less than 36 in-lb;
Weight of about 5 lbs;
Diameter less 8".

The use of motor-wheels having such specifications allows the golf cart 10, with a passenger 31 and a golf bag 52, climbing a slope of 5° at 12 mph, of 10° at 10 mph, of 8° at 15 mph, and of 20° at 6 mph.

Since motor-wheels are believed to be well known in the art, they will not be described herein in more detail.

Of course, driving wheels having other specifications can also be used without departing from the spirit and nature of the present invention.

The battery 22 is preferably in the form of a rechargeable battery, and allows to energize the driving wheels 18. More specifically, the battery 22 is of the plug-in type, allowing its fast and easy replacement, therefore preventing the requirement to store the cart 10 when the battery 22 needs to be recharged. Rechargeable and plug-in type batteries are believed to be well-known in the art and will not be described herein in more detail.

Each of the two driving wheels 18 are connected to the battery 22 by means of electric cables (not shown) or other connecting means, advantageously concealed within the base 26.

The controller 24 is also connected to both the battery 22 and the driving wheels 18 through electric cables (not shown) or other connecting means. In this case however, the cables are advantageously concealed in the tubular frame of the mounting structure 28.

The controller 24 comprises a CPU (central processing unit) (not shown), and a control panel 62 for a passenger to operate the golf cart 10, including steering, braking, and accelerating.

The control panel 62 includes a touch screen 64 for displaying and receiving information concerning, for example, a golf course, golfers scores, statistics, etc., contact switch 66, hand receiving openings 68, brake and accelerator buttons 70 and 72, direction buttons 74 for selecting forward, backward, and neutral directions, and a battery status indicator 76.

The contact switch 66 responds to a complementary electronic key (not shown). Alternatively, a lock for a conventional key or a start button may also be used.

The hand receiving openings 68 provide grip to handle the control panel 64, which is mounted to the mounting structure 28 so as to allow pivoting the control panel 62 and to translate this pivoting movement into electronic signals that are processed and then used by the CPU to control the motor wheels 18. As it is believed to be well known in the art, pivoting and rotation of a vehicle equipped with motor-wheels are achieved by varying the relative speed of such wheels 18. The control panel is mounted to the mounting structure 28 so as to be tiltable relative to the mounting structure 28. This allows the cart 10 to accommodate passengers having different height.

The brake and accelerator buttons 70–72 allows the passenger 31 to send to the controller commands indicative of his intention to stop the cart 10 or to increase its speed.

The controller is of course responsive to these buttons 70–72, and selectively sends appropriate command signal to a controlling electronic circuit (not shown) comprised within each of the two motor-wheels 18.

The controller 24 is preferably configured to limit the power during the acceleration for preventing removing of grass.

Similarly, the direction buttons 74 generate signals representative of the intention of the passenger 31 to move forward, backward, or to remove power to the two motor-wheels 18.

The battery status indicator 76 is advantageously in the form of a series of LED (Light Emitted Diode) that indicates the level of charge of the battery 22.

Alternatively, the control panel 62 may have other configuration and functionality without departing from the spirit and nature of the present invention.

The controller 24 advantageously includes input port for coupling the controller 24 to a computer (not shown) for receiving data information and/or controlling related software updates. Of course the coupling means may be in the form, for example, of a data cable or of infrared transmitter and receiver.

Of course, the controller 24 may take many other forms including for example, a combination steering wheels, accelerator and brake pedals with appropriate controlling circuitry.

The controller 24 is also advantageously configured to allow regenerative braking. Hence, the kinetic energy lost during braking is used for recharging the battery 22. This helps to increase the autonomy of the golf cart 10.

The controller 24 advantageously includes a remote sensor (not shown) to receive command signal from a remote control (not shown). This allows a player to remotely move the cart 10, for example to carry his bag 52, while he is away from it. Of course, the remote sensor and control communicate through a dedicated frequency or using a secure binary code to prevent unauthorized or accidental use.

The use of motor-wheels is advantageous since it renders unnecessary the need for a differential, for a steering system, and for a mechanical brake system, therefore minimizing the number of mechanical components and the probability of mechanical malfunctions. This allows to also minimize the needs for periodical inspections.

The configuration of the golf cart 10 provides lateral stability for slopes up to 26 percent.

Figure 4:
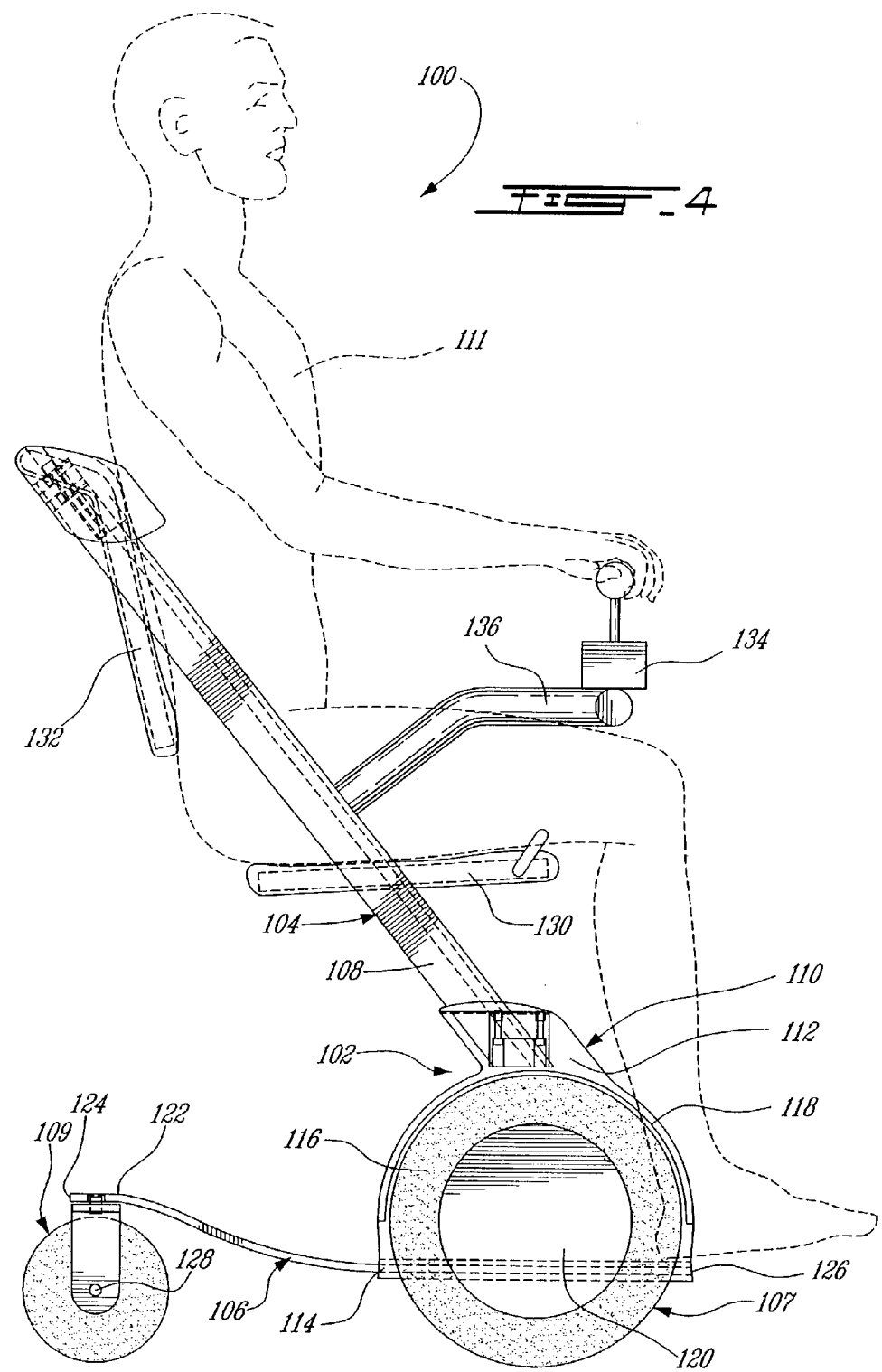
FIG. 4 is a side view of a wheelchair according to a second embodiment of a personal cart according to the present invention.

Turning now to FIG. 4, a wheelchair 100 according to a second embodiment of the present invention is illustrated.

The overall configuration of the wheelchair 100 is similar to the one of the golf cart 10. The wheelchair 100 comprises a frame assembly 102 including a passenger receiving structure 104 mounted on two longitudinal flat suspension members 106 (only one shown), two driving wheels 107, two driven wheels 109, a battery (not shown), and a controller (not shown). The passenger receiving structure 104 includes a mounting structure 108 secured to both suspension members 106 via a base 110.

The base 110 includes a generally flat portion (not shown) between two opposite lateral mounting structure receiving portions 112 (only one visible), and a battery receiving compartment (not shown) advantageously closed by an access door (also not shown).

The bottom portion of the base 110 is provided with two lateral suspension member receiving slots 114 (only one shown). The slots 114 are generally parallel to the flat portion of the base 110.

The base 110 also includes two driving wheel receiving recesses 116 (only one shown), each extending from a respective lateral mounting structure receiving portion 112 on the side opposite the flat portion. Each recess 116 defines by a semi-circular mudguard 118.

The recesses 116 are configured to receive and secure a driving wheel 107. More specifically, when the driving wheels 107 are in the form of motor-wheels, each recess 116 includes a motor-wheel securing means for fixedly mounting the rim of the motor-wheel into the recess 116. Alternatively, as it will be described hereinbelow with reference to FIG. 5, when the driving wheel 107 is in the form of a conventional free wheel 206, the recess 116 includes either a hub receiving aperture (not shown) or a hub for receiving a complementary opening in the axle of the wheel 107.

The suspension members 106 are in the form of a resilient flat member that includes a generally straight portion 120 integral with a swatted S-portion 122 upwardly biasing the distal end 124 from the proximal end 126.

The suspension members 106 are made of a composite material providing both rigidity and resilience. More specifically, the suspension member 106 includes directional and/or of bi-directional fibers.

Alternatively, the suspension member 106 may be made of a metal such as steel and aluminum.

The generally straight portion 120 of each suspension member 106 is inserted in a respective suspension member receiving slots 114. A driven wheel 110 in the form of a swivel wheel is mounted to each suspension member 106 near the distal end 124 thereof so that its rotational axis 128 is parallel to the flat surface defined by the swatted S-portion 122 adjacent to the distal end 124.

The driving wheel receiving recesses 116, the driving wheels 108, the suspension members 106, and the driven wheels 109 are so configured, sized and positioned that the driving and driven wheels 107 and 109 are leveled when mounted to the frame assembly 102 and that no forces are exerted unto one of the flat side of the suspension members 106.

A difference between the embodiments of a personal cart illustrated in FIGS. 4–5 and the embodiment illustrated in FIGS. 1–2 is that the driving wheels 107 are not directly secured to the suspension members 106 in the embodiments illustrated in FIGS. 4–5. However, a person skilled in the art will appreciate that the weight of a person 111 sitting in the wheelchair 100 and the major part of the weight of the wheelchair 100, are supported by the suspension members 106 since the driving wheels 107 are secured to the base 110 which, in turns, rests unto the suspension members 106.

The mounting structure 108 is in the form of an inverted U-shaped frame having its two parallel free ends respectively secured in the two opposite lateral mounting structure receiving portions 112 of the base 110. The U-shaped frame defines a plane. The U-shaped frame is so mounted to the base 110 as to define an angle with the straight portions 120 of the suspension members 106.

The passenger receiving structure 108 further comprises a seat 130 fixedly mounted to the mounting structure 108 between the two legs of the inverted U-shaped frame so as to be generally parallel to the flat portion of the base 110. Of course, the position of the seat 130 along the frame may vary to accommodate the size of the user 111. The passenger receiving structure 108 also includes a backrest 132 also secured to the mounting structure 108 between the two legs of the inverted U-shaped frame near the upper end thereof.

The seat 130 and backrest 132 are upholstered. Alternatively they can also be made of one of many materials including wood, metal, polymer, composite materials, etc. The upper end of the inverted U-shaped frame preferably extends a short distance from the backrest 132 to allow grip for hands to manually push or pull the wheelchair 100.

Many fastening means may be used to secure the seat 130 and backrest 132 to the U-shaped frame, including but not restricted to nuts and bolts, glue, etc.

The mounting structure 108 allows receiving a sitting person within a quadrilateral formed by the four wheels 107 and 109. Moreover, since the mounting structure 108 defines an angle with the two suspension members 106, and since the passenger receiving structure 104, which includes the mounting structure 108, is so mounted on the two suspension members 106 so as to rest thereon, the weight of the mounting structure 108 and of the user 111 is well distributed over the length of the two suspension members 106, which bring stability to the wheelchair 100.

Moreover, the angle of the mounting structure 108 relatively to the two suspension members 106 and to the ground also allows to limit the length of the wheelchair 100. The passenger receiving structure 104 allows suspending a user 111 over the carriage formed by the two suspension members 106 and the wheels 107 and 109 while minimizing the number of components and therefore the weight of the wheelchair, but without compromising its stability.

Indeed, the general configuration of the wheelchair 100 allows distributing the weight of a user along the two suspension members 106. Also, the fact that the attachment of the mounting structure 108 to the suspension members 106 occurs near the driving wheels 107 creates a lever effect that contributes a downward force on the suspensions 106 and wheels 107 and 109.

The passenger receiving structure 104 is preferably made of a polymeric material for example by rotational molding, blow molding or injection molding. Alternatively, another lightweight material such as aluminum can also be used.

The battery is preferably in the form of a rechargeable battery, and allows energizing the driving wheels 107. More specifically, the battery is of the plug-in type, allowing its fast and easy replacement. Rechargeable and plug-in type batteries are believed to be well-known in the art and thus will not be described herein in more detail.

The controller 24 comprises a CPU (central processing unit) (not shown), and an input means in the form of a joystick 134 mounted to the mounting assembly via a tubular support 136.

The joystick 134 allows a user 111 to send command to the CPU regarding his desired heading and speed. As for most wheelchair, bearing is achieved by varying the relative speed of the two motor-wheels 107. In the case of the present embodiment, this is achieved by the controller selectively managing inputs of power to the two wheels 107.

The controller is configured to allow regenerative braking. Hence, the kinetic energy lost during braking is used for recharging the battery. This helps increase the autonomy of the golf cart 10. As it is believed to be well-known in the art, braking is achieved by briefly and adequately reversing the speed of the driving wheels 107.

The controller and the battery act as actuating means for the wheelchair 100.

The controller includes a connector (not shown) for coupling the battery to a power outlet for recharging.

Turning now to FIG. 5 of the appended drawings, a wheelchair 200 according to a third embodiment of a personal cart according to the present invention is illustrated. Since the wheelchair 200 is very similar to the wheelchair 100, only the differences, and more specifically the actuating means 202 of the wheelchair 200 will be described herein in more detail. The general configuration of the wheelchair 200 is therefore as described with reference to FIG. 4. However, the actuating means differ: the controller and battery are replaced by a pair of actuating means 202 (only one shown), and the driving wheels are no longer in the form of motor-wheels but as conventional wheels 206, each having a hub 208 rotatably mounting the wheel 206 to the base 210.

More specifically, the actuating means 202 comprises a pair of endless belts 212, each one mounted to a respective leg of the U-shaped mounting structure 108 through a pair of pulleys 214–216. The pulleys 214–216 are rotatably mounted respectively to the distal and proximal ends 218–220 of the leg.

The pulleys 214–216 and the endless belts 212 are so configured and sized as to yield a gap 222 between the endless belt 212 and the mounting structure 108. The gap 222 allows a hand 223 of the user 111 to have access to the belt 212 for grabbing. The belt 212 is made of a resilient material such as rubber for providing both sufficient friction and comfort for the hands.

The pulley 216 is operatively coupled to the wheel 206 through a coupling means 224. More specifically, the coupling means includes a pinion 226 fixedly mounted to the pulley 216 so as to be coaxial therewith, and a gear 228 rotatably mounted to the base 210 so as to engage the pinion 226.

Each driving wheel 206 includes a gear 230 extending coaxially from the driving wheel 206. The gear 230 is configured and sized for engagement with the gear 228.

As will now appear obvious to a person skilled in the art, the actuating means 202 allows to transform an ergonomic sliding movement (see arrow 232) of the belt 212 into a rotational movement of the corresponding driving wheel 206 (see arrow 234).

In operation, sliding the belts 232 downwardly causes a clockwise rotation of the driving wheels 206, in turn causing the wheelchair to move forward. Sliding the belts 232 upwardly causes a counterclockwise rotation of the driving wheels 206, which causes the wheelchair to move backward.

Even though the coupling means 226–230 are described as gears, other operational coupling means can also be used, such as friction wheels.

The actuating means 202 is preferably provided with tension means for the belt 212.

Of course, the base 210 is adapted to house the proximal end 220 of the actuating means 202.

Since the wheelchair 200 is relatively light, including few mechanical components, and since the actuating means is ergonomic, it requires less effort to actuate than wheelchairs from the prior art.

Even though the suspension members of the above illustrated embodiment of the present invention are parallel, the suspension members of a personal cart according to the present invention are more generally forming two opposite sides of a quadrilateral defined by the wheels mounted thereon. The stability of the resulting cart however depends partially on the distance between the two suspension members and their configuration.

Although the present invention has been described hereinabove by way of preferred embodiments thereof, it can be modified, without departing from the spirit and nature of the subject invention as defined in the appended claims.

What is claimed is:

1. A personal cart comprising:
   two generally aligned and parallel flat resilient shock-absorbing suspension members, each having proximal and distal longitudinal ends;
   a passenger receiving structure secured to both suspension members near their respective proximal longitudinal ends so as to rest thereon, and extending both upwardly and longitudinally so as to generally define an angle with said suspension members;
   two driving wheels, each mounted to a respective suspension member near said proximal longitudinal end thereof;
   two driven wheels, each mounted to a respective suspension member near said distal longitudinal end thereof; and
   actuating means coupled to both driving wheels for selectively causing rotation of at least one of said two driving wheels.

2. A personal cart as recited in claim 1, wherein said two suspension members are made of a composite material.

3. A personal cart as recited in claim 2, wherein each of said two suspension members includes at least one of directional and bi-directional fibers.

4. A personal cart as recited in claim 2, wherein each of said two suspension members includes a central portion between first and second longitudinal end portions; each of said first and second longitudinal end portions being raised relatively to said central portion.

5. A personal cart as recited in claim 4, wherein said passenger receiving structure is secured to said central portion of both suspension members.

6. A personal cart as recited in claim 4, wherein said first longitudinal end portions include an opening to allow passage for a respective one of said two driving wheels.

7. A personal cart as recited in claim 6, wherein each of said two suspension members includes a transversal rod mounted to each of said two suspension members in said opening.

8. A personal cart as recited in claim 7, said transversal rod is removably mounted to each of said two suspension members in said opening.

9. A personal cart as recited in claim 6, wherein said suspension member includes a mudguard extending from said first longitudinal end portion adjacent said opening.

10. A personal cart as recited in claim 4, wherein said suspension member includes a mudguard extending laterally from said second longitudinal end portion.

11. A personal cart as recited in claim 4, wherein each of said two driven wheels is mounted to said second longitudinal end portion of a respective one of said two suspension members.

12. A personal cart as recited in claim 1, wherein each of said two driven wheels is selected from the group consisting of a swivel wheel and a fixed-type wheel.

13. A personal cart as recited in claim 1, wherein said passenger receiving structure and said two suspension members form an integral frame assembly.

14. A personal cart as recited in claim 13, wherein said integral frame assembly is made of a lightweight rigid material.

15. A personal cart as recited in claim 14, wherein said lightweight rigid material is selected from the group consisting of a polymer and aluminium.

16. A personal cart as recited in claim 15, wherein said lightweight and rigid material is a polymer, and said suspension member is made using a method selected from the group of consisting of injection molding, blow molding and rotational molding.

17. A personal cart as recited in claim 15, wherein said polymer is selected from the group consisting of cross-link polyethylene (PE), low-density PE, high-density PE, polyvinyl chloride (PVC), LLDPE, and polycarbonate.

18. A personal cart as recited in claim 1, wherein said passenger receiving structure includes a mounting structure and a base for securing the mounting structure to said two suspension members.

19. A personal cart as recited in claim 18, wherein said base includes a generally flat portion for receiving a standing passenger.

20. A personal cart as recited in claim 18, wherein said base includes at least one mounting structure receiving portion for receiving said mounting structure.

21. A personal cart as recited in claim 20, wherein said at least one mounting structure receiving portion includes two opposite lateral mounting structure receiving portions.

22. A personal cart as recited in claim 21, wherein said base includes two mudguard portions, each secured to a respective lateral mounting structure receiving portion opposite said flat portion.

23. A personal cart as recited in claim 21, wherein said mounting structure includes an inverted U-shaped tubular frame generally defining a plane and extending from the base so as to define an angle therewith.

24. A personal cart as recited in claim 23, wherein said U-shaped tubular frame includes two free ends; each of said two free ends being mounted in a respective of said two opposite lateral mounting structure receiving portions.

25. A personal cart as recited in claim 23, wherein said personal cart is a golf cart;
   said mounting structure including a bracket configured and sized for receiving a top portion of a golf bag, and said base including means for supporting a bottom portion of said golf bag.

26. A personal cart as recited in claim 25, wherein said means for supporting a bottom portion of said golf bag includes a semi-circular recess in said base.

27. A personal cart as recited in claim 26, wherein said base includes a generally flat portion for receiving a standing passenger; said semi-circular recess is practiced on a surface of said base angled relative to said flat portion of said base.

28. A personal cart as recited in claim 18, wherein said mounting structure includes a pole mounted to said base so as to extend therefrom with an angle relative to said two suspension members.

29. A personal cart as recited in claim 1, wherein each of said two driving wheels is a motor-wheel.

30. A personal cart as recited in claim 29, wherein said actuating means includes a battery connected to said motor-wheels, and a controller connected to said motor-wheels for selectively energizing at least one of said two motor-wheels.

31. A personal cart as recited in claim 29, wherein said controller includes an input port for coupling said controller to a remote computer.

32. A personal cart as recited in claim 29, wherein said controller is configured to allow regenerative braking.

33. A personal cart as recited in claim 29, further comprising a remote control for remotely sending a command to said controller.

34. A personal cart as recited in claim 29, wherein said controller includes a power limitator for limiting the acceleration of the cart from a neutral position.

35. A personal cart as recited in claim 29, wherein said controller includes a CPU (Central Processing Unit), and a control panel coupled to said CPU for sending command to said CPU.

36. A personal cart as recited in claim 35, wherein said control panel includes steering means, braking means, and accelerating means.

37. A personal cart as recited in claim 35, wherein said control panel is mounted to said passenger receiving structure so as to allow pivoting movement of said control panel; said controller being configured so as to be responsive to said pivoting movement and to selectively actuate at least one of said two driving wheels accordingly with said pivoting movement.

38. A personal cart as recited in claim 37, wherein said control panel includes hand receiving openings for facilitating pivoting movement thereof.

39. A personal cart as recited in claim 35, wherein said control panel includes a touch screen for displaying and receiving information.

40. A personal cart as recited in claim 35, wherein said control panel further including at least one of a contact switch, brake and accelerator command buttons, direction commands for selecting forward, backward, and neutral movement for the cart, and a battery status indicator.

41. A personal cart as recited in claim 40, wherein said controller is configured to create a first signal responsive to said at least one of a contact switch, brake and accelerator command buttons, direction commands; said controller being configured to sends a second signal representative to said first signal to a controlling electronic circuit comprised within each of said two motor-wheels.

42. A personal cart as recited in claim 30, wherein said passenger receiving structure includes a mounting structure and a base for securing the mounting structure to said two suspension members; said battery being mounted in a battery-receiving compartment in said base.

43. A personal cart as recited in claim 30, wherein said battery is rechargeable.

44. A personal cart as recited in claim 30, wherein said battery is a plug-in type battery.

45. A personal cart as recited in claim 18, wherein said two suspension members are received in a bottom portion of said base.

46. A personal cart as recited in claim 45, wherein each of said two suspension members having a generally straight portion.

47. A personal cart as recited in claim 46, wherein said bottom portion of said base is provided with two slots, each one receiving said generally straight portion of a respective one of said two suspension members.

48. A personal cart as recited in claim 47, wherein each one of said two suspension members further includes a swatted S-portion integral and aligned with said generally straight portion; said swatted S-portion upwardly biasing said distal end from said proximal end of said suspension member.

49. A personal cart as recited in claim 48, wherein each of said two driven wheels is mounted to a respective of said two suspension members near said distal end.

50. A personal cart as recited in claim 45, wherein said base includes two lateral driving wheel receiving recesses.

51. A personal cart as recited in claim 50, wherein each of said two lateral driving wheel receiving recesses defines a mudguard.

52. A personal cart comprising:
a frame assembly including i) two longitudinal flat resilient shock-absorbing suspension members generally lying in a first plane, each longitudinal resilient shock-absorbing suspension member having first and second longitudinal ends, and ii) a mounting structure generally defining a second plane defining an angle with said first plane; said second plane intersecting both longitudinal resilient shock-absorbing suspension members near their first longitudinal ends;
two parallel driving wheels, each rotatably mounted to said frame assembly near said first longitudinal end of a respective one of said two longitudinal resilient shock-absorbing suspension members;
two driven wheels, each rotatably mounted to said second longitudinal end of a respective one of said longitudinal resilient shock-absorbing suspension members; and
actuating means coupled to said two parallel driving wheels for selectively causing rotation of at least one of said two parallel driving wheels.

* * * * *